United States Patent [19]
Rao et al.

[11] 3,821,303
[45] June 28, 1974

[54] IMPROVEMENTS IN OR RELATING TO THE MANUFACTURE OF CYCLOHEXANONE OXIME FROM CYCLOHEXANONE

[75] Inventors: Vaddadi Siva Bhaskar Rao; Kottil Wallapil Gopinath; Madhur Srinivas Iyengar, all of Jorhat, India

[73] Assignee: Council of Scientific and Industrial Research, New Delhi, India

[22] Filed: July 12, 1972

[21] Appl. No.: 271,042

[52] U.S. Cl. ............................ 260/566 A, 423/387
[51] Int. Cl. ............................................ C07c 131/04
[58] Field of Search ......... 260/566 A; 423/387, 388

[56] References Cited
OTHER PUBLICATIONS

Vogel, "A Textbook of Practical Organic Chemistr 3rd Ed. pp. 343 (1962).

Primary Examiner—Leon Zitver
Assistant Examiner—Gerald A. Schwartz
Attorney, Agent, or Firm—Waters, Roditi, Schwartz & Nissen

[57] ABSTRACT

A process for manufacture of cyclohexanone-oxime from cyclohexanone and hydroxylamine in which the hydroxylamine required for the reaction is produced in situ by a reaction of sodium nitrite, zinc, ammonium chloride and carbon dioxide, whereby cyclohexanone is converted in one stage to the oxime without any prior isolation or purification of hydroxylamine.

3 Claims, No Drawings

IMPROVEMENTS IN OR RELATING TO THE MANUFACTURE OF CYCLOHEXANONE OXIME FROM CYCLOHEXANONE

This invention relates to the improvements in and relating to the manufacture of cyclohexanone oxime from cyclohexanone. Cyclohexanone oxime is an important intermediate for manufacture of caprolactam which is a starting material for the production of Nylon-6 and other nylons. Cyclohexanone oxime has been produced by a number of methods. Following are the hitherto known methods employed:

1. Reaction of cyclohexanone with hydroxylamine.
2. Reaction of cyclohexanone with nitrosyl chloride in the presence of ultra violet light.
3. Nitration of cyclohexane to the corresponding nitro compound, followed by reduction to cyclohexanone oxime.

Methods 2 and 3 are not connected with the present discussion and will not be described further. The most common method in making cyclohexanone oxime is by the method 1 viz. The reaction of cyclohexanone with hydroxylamine either in the form of hydrochloride or sulphate. The process, therefore, involves:

1. Production of hydroxylamine hydrochloride or sulphate.
2. Reaction of this hydroxylamine with cyclohexanone.

The process, therefore, becomes a two stage process. The main object of the present invention is the generation of hydroxylamine in a solution which also contains cyclohexanone, whereby cyclohexanone is converted in one stage to the oxime without any prior isolation or purification of hydroxylamine or its hydrochloride. The hydroxylamine required for the reaction is produced in solution by the reduction of sodium nitrite with zinc. A stream of carbon dioxide is simultaneously passed through the solution which converts soluble zinc salts to insoluble carbonates. By this procedure the entire quantity of zinc used for reaction is recovered quantitatively in the form of zinc carbonate. The zinc carbonate obtained as by-product can be converted to zinc oxide, which has extensive use in the pigment industry.

The present invention consists of a process for the production of cyclohexanone oxime which comprises the reaction of cyclohexanone with hydroxylamine wherein the hydroxylamine required for the reaction is produced in situ by reaction of sodium nitrite, zinc, ammonium chloride in a stream of carbon-dioxide and wherein the zinc used in the reaction is quantitatively recovered as a byproduct as zinc carbonate. The reaction produces cyclohexanone oxime in one step, avoiding the isolation of pure hydroxylamine. Since the reaction is exothermic, no external heating is required for the reaction.

The procedure of this invention is as follows:

1. Stirring a mixture of cyclohexanone, sodium nitrite, zinc dust ammonium chloride and water for 6-8 hours in a closed vessel.
2. Passing carbon dioxide at a slow rate through the reaction mixture to maintain the solution slightly acidic, and to eliminate oxygen from the reaction mixture.
3. Separating the upper oily layer at the end of the reaction and extracting the aqueous layer with benzene.
4. Recovery of the zinc carbonate from the aqueous solution by filtration.
5. Distillation of the reaction mixture under vacuum to remove the unreacted cyclohexanone.
6. Crystallization of the crude cyclohexanone oxime to obtain the pure product.

The following example illustrates the practice of the invention:

To the cyclohexanone 98.09 g (1.0 mole) in a one liter, three necked flask fitted with a water cooled condenser and a stirrer was added 1,000 ml. of water, 104 gms of sodium nitrite, (1.5 mole) 80.25 gms of ammonium chloride and carbon dioxide was passed therein at a slow rate. Zinc dust 100 g. (85% purity) was added in small portions. The reaction became exothermic, and the addition of zinc was done in such a way that the temperature was maintained around 60-70°C. After all the zinc dust, had been added the reaction was allowed to continue for an hour, during which time the reaction came to room temperature. The oily layer was decanted, and the residue was extracted with benzene (500 ml). The benzene extract was mixed with the oily layer and the product was distilled under vacuum (10-12 mm) to remove first, benzene and then the unreacted cyclohexanone. As the unreacted cyclohexanone was removed, the rest solidified to cyclohexanone oxime of 95.3% purity (GLC), yield 60-65%.

The following are the main advantages of the process:

1. Cyclohexanone is converted into oxime in one stage without involving prior preparation of pure hydroxylamine hydrochloride or sulphate.
2. The zinc used in the reaction is quantitatively recovered in the form of zinc carbonate, which can be converted into zinc oxide of high purity. Since the zinc oxide which is quantitatively recovered sells at about the same price as metallic zinc, the cost of this component does not enter into the cost of the product.
3. The reaction is exothermic and does not involve any external heating; it can be easily controlled by controlling the carbon dioxide flow.
4. Since the reaction does not involve any high pressures or temperatures, the equipment required is very simple and has a low capital requirement.

We claim:

1. A process for the manufacture of cyclohexanone oxime, comprising reacting sodium nitrite, zinc, ammonium chloride and carbon dioxide to thereby generate in situ hydroxylamine, and reacting cyclohexanone with said hydroxylamine to form cyclohexanone oxime.

2. A process according to claim 1, wherein the zinc is quantitatively recovered in the form of zinc carbonate.

3. A process according to claim 1, said process being carried out at a temperature of 60-70°C.

* * * * *